United States Patent Office 2,760,632
Patented Aug. 28, 1956

2,760,632

PLASTICIZATION OF SULFUR VULCANIZABLE MATERIALS, AND RELATED COMPOSITIONS

John C. Hillyer, Bartlesville, Okla., assignor to Phillips Petroleum Company, a corporation of Delaware No Drawing. Application January 2, 1951,
Serial No. 204,067

8 Claims. (Cl. 260—84)

This invention relates to the plasticization of sulfur-vulcanizable organic plastic substances containing unsaturated carbon-to-carbon bonds, and to associated plasticizer-containing materials. In one embodiment this invention relates to a method for plasticizing natural and synthetic rubbers. In another embodiment this invention relates to new compositions comprising natural and synthetic rubbers each incorporated with one or more selected organic esters.

Various types of materials have been employed as softeners or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished products are of little value for many purposes. One of the disadvantages of some synthetic elastomers is that they do not possess sufficient tack. A plasticizer which gives a product of improved tack as well as other good physical properties is highly desirable.

I have now discovered novel softeners which by their incorporation with rubber stocks, by which I mean to include natural rubber, synthetic rubber, and reclaimed rubber, are good rubber plasticizes and tackifiers and also impart other desirable properties to the rubber. These materials are applicable in compounding natural and synthetic rubbers and reclaimed rubber, and they can be used alone as softeners and tackifiers in a compounding recipe or as mixtures with each other or in conjunction with other softeners. They are effective not only as plasticizers and tackifiers but the rubber in which they are used shows particularly good aged flex life and tensile strength. These novel softeners have especial utility as plasticizers of rubbers of the Perbunan type, i. e., butadiene-acrylonitrile copolymers, since they form rubber compositions having particularly low extractability characteristics. Rubber compositions having these properties are of especial value as applied to the manufacture of articles which are used in contact with hydrocarbon solvents, such as gaskets, fuel tank linings and the like.

An object of this invention is to provide a method for plasticizing a sulfur-vulcanizable organic plastic substance containing unsaturated carbon-to-carbon bonds. Another object is to provide new compositions each comprising a sulfur-vulcanizable organic plastic substance containing unsaturated carbon-to-carbon bonds incorporated with one or more ester derivatives of a polyhydric alcohol and a monocarboxylic organic acid. Another object is to provide selected vulcanizates as new compositions. Another object is to provide a method for plasticizing natural and synthetic rubber stocks. Another object is to provide improved softeners which impart desirable swelling and extractability characteristics to Perbunan rubbers. Other objects will be apparent to one skilled in the art from the accompanying disclosure and discussion.

In accordance with my invention, I have provided a method for plasticizing sulfur-vulcanizable organic plastic substances containing unsaturated carbon-to-carbon bonds, and new compositions comprising such sulfur-vulcanizable organic materials incorporated with one or more novel plasticizing agents. My invention is well applied to the plasticization of natural rubber, reclaimed rubber and synthetic rubber. I have discovered that natural rubber and sulfur-vulcanizable synthetic rubber-like materials, or rubber substitutes, as for example butadiene-styrene copolymer, Perbunan, butyl, GR–I, neoprene, and all other sulfur-vulcanizable synthetic rubbery materials, and reclaimed rubber can be plasticized by the incorporation therewith of an organic ester of an open-chain polyhydric alcohol containing from 3 to 6 carbon atoms in the molecule and a monocarboxylic acid containing from 1 to 20 carbon atoms in the molecule.

In a preferred embodiment, the ester plasticizing agents of my invention are ester derivatives of a monobasic organic acid containing from 1 to 6 carbon atoms in the molecule. Perbunan rubbers incorporated with these preferred plasticizing agents, and then vulcanized, exhibit high non-extractability and desirable swelling characteristics, being thereby particularly suitable for use as fuel tank linings, gaskets and the like. Of the preferred ester plasticizers of my invention I have found erythritol, pentaerythritol, and glycerol esters of butyric acid to be of particular value with respect to swelling and non-extractability characteristics of the resulting vulcanized rubber stock, when utilized with Perbunan rubber.

The ester plasticizing agents of this invention can be prepared in any desired manner, generally by the interreaction of the polyhydric alcohol with a saturated or unsaturated monobasic organic acid or the corresponding anhydride. When producing the esters herein described, the polyhydric alcohol is brought into contact with the acid or the corresponding anhydride, and the mixture heated under conditions to effect reaction. In some instance an inert medium or solvent is employed. The esters thus prepared are applicable in compounding both natural and synthetic rubber, and they can be used alone as plasticizers in a compounding recipe or as mixtures with each other, or in conjunction with other softeners. They are effective not only as plasticizers but the rubber in which they are used shows particularly good aged flex life, high modulus, and tensile strength. They are especially valuable in rubbers of the Perbunan type, i. e., butadiene-acrylonitrile copolymers, since they give products which when vulcanized show unusually low extractability characteristics. Such products are used in the manufacture of articles which come in contact with hydrocarbon solvents, such as fuels.

Esters which are applicable as rubber plasticizers are those generally in the molecular weight range from 200 to 1300 having an oxygen content in the range from 8 to 55 per cent. The products may contain from 1 to 6 ester groups, i. e., the polyhydric alcohol, may be partially or completely esterified. The preferred plasticizers are those having molecular weights in the range from 275 to 425 with the per cent oxygen in the range from 15 to 50. Examples of esters in the broad molecular weight range are erythritol tetraacetate, erythritol tri- and tetrapropionates, erythritol tri- and tetrabutyrates, erythritol monooleate, pentaerythritol monomyristate, pentaerythritol tetraacetate, pentaerythritol monooleate, pentaerythritol monolaurate, pentaerythritol tetraacrylate, glycerol triacetate, glycerol distearate, glycerol trilaurate, mannitol tripalmitate, mannitol diacetate, mannitol hexabutyrate, the diacetate of 1,4-dihydroxy hexane, the dioleate of 1,4-dihydroxy butane, the dibutyrate of 1,4-dihydroxy butene-2, and the like.

Acids which are applicable for the production of the polyhydric alcohol esters herein described are monobasic aliphatic acids which may be either saturated or unsaturated and may contain from 1 to 2 carbon atoms. Examples of such acids are: formic, acetic, propionic, butyric, caproic, caprylic, lauric, myristic, palmitic, stearic, acrylic, decylenic, dodecylenic, and oleic acids. Unsatulated acds thus employed have a tendency to undergo polymerization themselves or they may form esters that will polymerize under the conditions of the reaction. In such cases suitable inhibitors such as tert-butylcatechol, can be added to the reaction mixture to suppress polymerization.

Catalysts are advantageously employed in conducting an esterification to produce the ester plasticizers of my invention, particularly when a solvent is employed and the temperature is relatively low. It is desirable that a catalyst be soluble in the reactants. Suitable catalytic materials are those of the sulfonic acid type, such as sulfonic acid itself, p-xylene sulfonic acid, and p-toluene sulfonic acid. When anhydrides are employed as esterifying agents instead of acids, suitable catalysts are pyridine and sodium acetate. The amount of catalyst will generally be in the range from 0.1 to 10 per cent based on the polyhydric alcohol.

When employing a solvent in the esterification to form the ester plasticizing agents of this invention, it is desirable that it be one in which the reactants are soluble since optimum results are obtained when only one phase is present. The solvent should be of such nature that it can easily be removed from the reaction mixture. Solvents which are applicable include ethers, such as diethyl ether and diisopropyl ether, polyethers, such as dioxane, dimethyl ether of ethylene glycol and dimethyl ether of diethylene glycol, chlorinated hydrocarbons, such as chloroform, carbon tetrachloride, methylene chloride, and ethylene dichloride, and aromatic hydrocarbons, such as benzene, toluene, and xylene. Sufficient solvent is ordinarily used to dissolve the reactants and frequently much larger quantities are employed, even amounts large enough to give a solution containing only one per cent by weight of the polyhydric alcohol. Instead of using a solvent as mentioned above, one method of operation comprises the use of a large excess of acid which serves as a medium for the reaction.

Two factors which control the degree of the esterification to form my novel plasticizing agents are the ratio of reactants, and reaction temperature. Lower temperatures are generally employed for the preparation of the mono-esters than are used for the production of more highly esterified products with the highest temperatures being used in effecting complete esterification. Reaction temperature is governed by the reactivity of the acid employed as well as the degree of esterification desired. When operating with the more active acids it is convenient and frequently preferred to use a solvent, particularly when less than 100 per cent esterification is desired. For 100 per cent esterification it is preferred in many instances to carry out the reaction in the absence of a solvent, especially when the less active acids are used.

One convenient method of following the course of the esterification reaction is to remove small portions of the reaction mixture at intervals and determine the saponification equivalent. By so operating the reaction can be halted when a product of the desired degree of esterification has been formed. An alternative procedure is to collect and measure the water formed from time to time as the reaction proceeds.

Esterification reaction temperatures may vary from 50 to 300° C., depending largely upon the activity of the acid. Reaction time will vary from 1 to 72 hours, depending upon the temperature, activity of the monobasic acid reactant, and the degree of esterification desired. Other factors which affect reaction time include the presence or absence of a solvent or catalyst. Generally the reaction is allowed to proceed until no more water is evolved or until all the acid is consumed.

The esterification of the polyhydric alcohol with which my invention is concerned can be effected by the use of a single acid or anhydride, or a mixture of acids or anhydrides. In some instances one acid may be used and partial esterification effected after which a different acid is added and the reaction continued.

The ester plasticizing agents of my invention range from colorless liquids to white, crystalline solids depending upon the esterifying agent employed.

The proportions of the ester plasticizers employed with respect to the rubber stock, in accordance with my invention, vary, depending upon the type of rubbery polymer being processed and the properties desired in the finished product, i. e., the plasticizer-rubber product preceding or subsequent to vulcanization or both, as desired. Generally the amount of plasticizer employed is within the limits of from 1 to 25 parts by weight per 100 parts of rubber stock, although generally that amount is in the range of from about 2 to 12 parts.

I can incorporate the softeners of my invention with the material to be plasticized by any suitable method, such as (1) adding the softener to a synthetic rubber latex and then coagulating same in accordance with latex masterbatch procedure, or (2) introducing the softener on the mill.

My invention is well applied to plasticization of Perbunan rubbers prepared by copolymerizing acrylonitrile and 1,3-butadiene in a range of ratios of 10:90 to 40:60 parts by weight. By incorporating the softener materials of my invention with a Perbunan rubber and vulcanizing the mixture, I am able to prepare rubber vulcanizates of particularly high swelling and low extractability characteristics, when contacted with hydrocarbons, particularly those comprising organic solvents, gasoline-like materials or jet fuels.

Rubber or rubber-like materials containing the softeners of my invention are preferably cured or vulcanized for a period of time in the range of from 20 to 75 minutes. In the accompanying claims, reference to a vulcanizate or product of vulcanization of a rubber or rubber-like material compound with a softener material of my invention means that the vulcanization occurred after admixture of these materials with each other.

The following examples serve to further illustrate my process for plasticizing natural and synthetic rubber, and new and novel plasticizer-containing compositions formed in accordance with my invention, by which I mean to include those new compositions in their form before vulcanization and also after vulcanization. The reactants and their proportions and the other specific ingredients employed, as illustrated in the examples, are presented as being typical and should not be construed to limit the invention unduly.

*Example I*

Erythritol tetrabutyrate was prepared by reacting 0.5 gram mols of erythritol with 3 gram mols of butyric acid. The mixture to be reacted was heated under reflux at atmospheric pressure, and water was removed during the reaction as a water-butyric acid azeotrope. The reaction was continued until no more water was formed. The ester had a saponification equivalent (equivalent weight of ester) of 102 (calculated value, 100.5).

Erythritol tetrabutyrate, prepared as described above, was evaluated as a plasticizer in a tread recipe using a 41° F., 60 Mooney (ML-4), 71/29 butadiene-styrene elastomer. The following recipe was employed:

| | Parts by weight |
|---|---|
| Butadiene-styrene rubber | 100 |
| Carbon black [1] | 50 |
| Zinc oxide | 3 |
| Stearic acid | 1 |
| Flexamine [2] | 1 |
| Sulfur | 1.75 |
| Santocure [3] | 1 |
| Plasticizer (erythritol tetrabutyrate) | 10 |

[1] Philblack-O, a furnace-type, high abrasion carbon black.
[2] A physical mixture containing 65 per cent of a complex diarylamine-ketone reaction product and 35 per cent of N,N¹-diphenyl-p-phenylenediamine.
[3] N-cyclohexyl-2-benzothiazolesulfenamide.

A control stock was made from the same recipe containing equal parts of a blend of Circosol-2XH with Paraflux as the plasticizer. The rubber stocks were compounded and then cured 30 minutes at 307° F. and physical properties of the vulcanizate determined as follows:

| | Plasticizer Used | |
|---|---|---|
| | Erythritol Tetrabutyrate | Circosol-Paraflux Blend [1] (Control) |
| Unaged Samples: | | |
| Stress-strain properties at 80° F.— | | |
| 300 per cent modulus, p. s. i. | 1,870 | 1,270 |
| Tensile, p. s. i. | 4,010 | 3,420 |
| Elongation, percent | 525 | 625 |
| Stress-strain properties at 200° F., 45 minute cure— | | |
| 300 percent modulus, p. s. i. | 1,860 | 1,120 |
| Tensile, p. s. i. | 2,400 | 1,940 |
| Elongation, percent | 360 | 420 |
| Hysteresis, $\Delta T$, ° F. | 69.9 | 76.3 |
| Resilience, percent | 62.9 | 63.3 |
| Flex life, M | 25.8 | 26.5 |
| Shore hardness | 62 | 55 |
| Compression set, percent | 8.4 | 21.6 |
| Compounded MS 1½ at 212° F. | 43.5 | 43.5 |
| Extrusion, grams/minute | 78 | 89.5 |
| Gehman F. P. | −52 | −51 |
| Tack, sep'n load after 8 days | 200 | 210 |
| Oven Aged 24 Hours at 212° F.: | | |
| Stress-strain properties at 80° F.— | | |
| 300 percent modulus, p. s. i. | 2,710 | 2,020 |
| Tensile, p. s. i. | 4,200 | 3,430 |
| Elongation, percent | 400 | 435 |
| Hysteresis, $\Delta T$, ° F. | 69.3 | 63.8 |
| Resilience, percent | 64.6 | 68.0 |
| Flex, life, M | 12.1 | 5.5 |
| Shore hardness | 68 | 64 |

[1] Circosol-2XH is a petroleum hydrocarbon softener, containing hydrocarbons of high molecular weight, in the form of a heavy, viscous, transparent, pale green, odorless liquid of low volatility; sp. gr. 0.940; Saybolt viscosity at 100° F., about 2,000 seconds. Paraflux is an asphaltic flux.

*Example II*

Erythritol tetrabutyrate, prepared in accordance with the procedure of Example I, was employed as a plasticizer with a 74/26 butadiene-acrylonitrile copolymer using the following compounding recipe:

| | Parts by weight |
|---|---|
| Butadiene-acrylonitrile copolymer | 100 |
| Carbon black (Philblack A, medium abrasion furnace black) | 60 |
| Sulfur | 1.5 |
| Benzothiazyl disulfide | 1.5 |
| Zinc oxide | 5 |
| Stearic acid | 1.5 |
| Plasticizer (erythritol tetrabutyrate) | 10 |

The materials were compounded and cured at 307° F. for 30 minutes. A control for comparison was run using TP-90B (a high molecular weight polyether) as a plasticizer. The results were as follows:

| Plasticizer | 80° F. | | | Percent Compression Set | Percent Swell [1] | Percent Extracted [2] | Gehman Freeze Point, °C. |
|---|---|---|---|---|---|---|---|
| | 300% Modulus, p. s. i. | Tensile, p. s. i. | Percent Elongation | | | | |
| Erythritol Tetrabutyrate | 2,360 | 2,780 | 340 | 9.0 | 44.2 | 1.2 | −30.5 |
| TP-90B | 1,980 | 2,480 | 370 | 16.9 | 36.4 | 5.2 | −42 |

[1] Swelling tests were made on the cured samples by immersing them in a mixture containing 30 percent toluene and 70 percent isooctane at room temperature (80° F.) for seven days.
[2] The quantity of extracted material was determined by evaporating the immersion liquid at the conclusion of the swelling test, drying the residue in an oven at 220° F. for 30 minutes, and weighing.

*Example III*

Five erythritol esters were prepared and tests made for compatibility and swelling with natural rubber and different types of synthetic rubbers. The different esters and their method of preparation are shown below:

1. *Erythritol tetracetate.*—Erythritol (0.1 gram mol) was esterified using an excess of acetic acid and one gram toluene sulfonic acid as a catalyst in the presence of about 200 cc. benzene as a solvent. The reaction was carried out over a period of about 8 hours (until water was no longer formed) at the temperature of refluxing benzene. As the reaction proceeded, water was removed as a water-benzene azeotrope. Benzene was removed in vacuo at the conclusion of the reaction. The resulting ester had a saponification equivalent of 71.5 (calculated value, 72.5) and a melting point of 87–88° C.

2. *Erythritol tetrapropionate.*—A mixture of 0.1 gram mol erythritol, 120 grams propionic acid and 1 gram p-xylenesulfonic acid was refluxed for 12 hours. The excess of propionic acid served as a solvent for the reaction. The ester had a saponification equivalent of 86.7 (calculated value, 86.5) and a refractive index $n_D^{20}$ 1.4400.

3. *Erythritol tetrabutyrate.*—(See Example I).

4. *Erythritol monooleate.*—Erythritol (0.3 gram mol) and 0.15 gram mol oleic acid were charged to a reactor and esterification was carried out at 300° C. in an atmosphere of nitrogen. Water was removed as it was formed during the reaction. Upon cooling the reaction mixture and addition of 300 cc. ethyl alcohol, 17 grams erythritol crystallized and was removed by filtration. Approximately half the erythritol reacted with the oleic acid, a ratio of one mol erythritol per one mol of acid to give the monooleate.

5. *Erythritol tetraoleate.*—Erythritol (0.1 gram mol) was treated with 0.5 gram mol oleic acid at a temperature of 230–280° C. for eight hours (until water was no longer formed). Water was removed as it was formed. The reaction was effected in an atmosphere of nitrogen. The resulting ester had a saponification equivalent of 300 (saponification equivalent calculated for the tetra ester was 295 and for the tri ester was 305).

Compatibility and swelling tests of the above described esters with Perbunan rubber, GR-S, natural rubber, and butyl rubber were made by immersing samples of the rubber in the esters for six days at 80° C. Since erythritol tetraacetate was a solid, it was mixed with 10 per cent erythritol tetrapropionate in order to obtain a liquid material suitable for this type of test. The increase in volume of each rubber sample was measured by water displacement and the percent swell calculated. Two standard softeners, TP-90B and dioctyl phthalate, were used as controls. After the samples were removed from contact with the plasticizers, they were allowed to stand, and observations were made from time to time. In some recipe as controls. The compounded stocks were then cured at 307° F. for 30 minutes. The following evaluation data were obtained:

| Plasticizer | 80° F. | | | Percent Compression Set | Percent Cold, Compression Set | Gehman Freeze Point, ° C. | Percent Extracted |
|---|---|---|---|---|---|---|---|
| | 300% Modulus, p. s. i. | Tensile, p. s. i. | Percent Elongation | | | | |
| a [1] | 1,480 | 2,680 | 460 | 14.8 | 99.1 | −32 | 6.3 |
| b [1] | 1,480 | 2,630 | 435 | 14.4 | 100.0 | −32 | 6.6 |
| c [1] | 1,550 | 2,750 | 445 | 13.2 | 99.4 | −32 | 5.9 |
| TP-90B | 1,590 | 2,840 | 440 | 15.0 | 68.2 | −41 | 4.8 |
| Dibutyl Phthalate | 1,380 | 2,560 | 460 | 15.0 | 95.3 | −37 | 4.7 |

[1] a. Lauric acid ester of erythritol; b. Lauric acid ester of pentaerythritol; c. Lauric acid ester of glycerol.

instances the plasticizer tended to bleed or sweat out of the rubber indicating that compatibility was not complete. The following results were obtained:

| Plasticizer | Percent Increase in Volume | | | |
|---|---|---|---|---|
| | Perbunan Rubber [2] | GR-S [3] | Natural Rubber | Butyl Rubber [4] |
| Erythritol tetraacetate+10% erythritol tetrapropionate | 26 | 0 | 5 | |
| Erythritol tetrapropionate | 163 | 26 | 13 | 5 |
| Erythritol tetrabutyrate | 142 | 31 | 34 | 2 |
| Erythritol monooleate | 41 | 42 | 63 | |
| Erythritol tetraoleate | [1] 35 | [1] 69 | [1] 111 | |
| TP-90B | [1] 99 | [1] 89 | [1] 135 | [1] 10 |
| Dioctyl phthalate | [1] 117 | [1] 147 | [1] 305 | |

[1] Bleeding or sweating out of plasticizer.
[2] Butadiene-acrylonitrile copolymer.
[3] Butadiene-styrene copolymer.
[4] Isobutylene-butadiene copolymer.

*Example IV*

Lauric acid esters of erythritol, pentaerythritol, and glycerol were prepared and evaluated as plasticizers in a tread recipe using a 41° F., 60 Mooney (ML-4), 71/29 butadiene-styrene elastomer. The compounding recipe of Example I was employed. A blend of equal parts Circosol-2XH and Paraflux was evaluated in the same recipe and procedure as a control. The compounded stocks were cured for 30 minutes at 307° F. The following evaluation data were obtained:

The data in the above examples illustrate superiority of the rubber stocks compounded with the plasticizing agents of my invention over the controls employed, particularly with their respect to modulus, and tensile strength, and to their utility as applied to Perbunan type rubbers, inasmuch as the resulting Perbunan compositions when vulcanized exhibit unusually low extractability characteristics and swelling characteristics, which make them especially valuable as hydrocarbon fuel tank liner materials, gaskets, and the like.

As illustrated in Example III, the ester plasticizing agent derivatives of monobasic organic acids containing less than 6 carbon atoms in the molecule are particularly compatible with both natural rubber and synthetic rubber or rubberlike materials.

As will be evident to those skilled in the art, various modifications can be made or followed, in the light of the foregoing disclosure and discussion, without departing from the spirit or scope of the disclosure or from the scope of the claims.

I claim:

1. The product of vulcanization of 100 parts by weight of a rubbery copolymer of 1,3-butadiene and acrylonitrile which has been vulcanized with sulfur in the presence of from 1 to 25 parts by weight of erythritol tetrabutyrate.

2. A composition comprising a rubbery copolymer of 1,3-butadiene and acrylonitrile containing erythritol tetrabutyrate as a plasticizer therefor.

3. A method for plasticizing a rubbery copolymer of

| Plasticizer | 80° F. | | | 200° F.,[2] Tensile, p. s. i. | ΔT ° F. | Percent Resilience | Percent Compression Set | Flex Life, M | Shore Hardness | MS 1½ | Extrusion at 250° F. | |
|---|---|---|---|---|---|---|---|---|---|---|---|---|
| | 300 Percent Modulus, p. s. i. | Tensile, p. s. i. | Percent Elongation | | | | | | | | In./Min. | Gm./Min. |
| Lauric acid ester of erythritol | 1,360 | 3,910 | 600 | 1,940 | 62.5 | 63.7 | 18.5 | 13.0 | 54 | 33 | 40.2 | 98.5 |
| Lauric acid ester of pentaerythritol | 1,400 | 3,720 | 585 | 2,020 | 61.2 | 63.9 | 17.1 | 30.6 | 50 | 35 | 42 | 104.5 |
| Lauric acid ester of glycerol | 1,560 | 3,650 | 545 | 2,020 | 58.1 | 64.8 | 15.3 | 11.4 | 51 | 34 | 45.5 | 105.5 |
| Control [1] | 1,170 | 3,560 | 610 | 2,020 | 66.9 | 61.5 | 17.9 | 31.5 | 54 | 37.5 | 40.1 | 100 |
| OVEN AGED 24 HOURS AT 212° F. | | | | | | | | | | | | |
| Lauric acid ester of erythritol | 2,270 | 3,650 | 420 | | 50.3 | 68.8 | | 6.4 | 61 | | | |
| Lauric acid ester of pentaerythritol | 2,320 | 3,600 | 400 | | 51.0 | 69.2 | | 11.5 | 58 | | | |
| Lauric acid ester of glycerol | 2,380 | 3,740 | 415 | | 51.0 | 69.9 | | 7.9 | 60 | | | |
| Control [1] | 2,170 | 3,530 | 425 | | 53.0 | 67.7 | | 10.5 | 60 | | | |

[1] Circosol-Paraflux blend described.
[2] 45 minute cure.

The lauric acid esters of erythritol and glycerol, evaluated as above described are non-homogeneous and probably consist of mixtures of mono-, di-, and tri-esters.

*Example V*

Each of the lauric acid ester plasticizers of Example IV were evaluated in the gasket-type recipe of Example II. TP-90B and dibutyl phthalate were evaluated in the same 1,3-butadiene and acrylonitrile and concomitantly producing a resulting vulcanizable rubbery composition which when vulcanized exhibits low extractability and improved swelling characteristics, comprising adding to 100 parts by weight of said copolymer from 1–25 parts by weight of erythritol tetrabutyrate, maintaining the resulting admixture under conditions so as to uniformly mix the said tetrabutyrate with said copolymer, and recovering the said rubbery copolymer in a plasticized form as product of the process.

4. A composition comprising a rubbery copolymer of 1,3-butadiene and acrylonitrile incorporated with an organic ester selected from the group consisting of erythritol tetrabutyrate, erythritol tetraacetate, erythritol tetrapropionate, erythritol monooleate, erythritol tetraoleate, erythritol laurate, pentaerythritol laurate and glycerol laurate.

5. A method for plasticizing a rubbery copolymer of 1,3-butadiene and acrylonitrile and concomitantly producing a resulting vulcanizable rubbery composition which when vulcanized exhibits low extractability and improved swelling characteristics, comprising adding to 100 parts by weight of said copolymer from 1–25 parts by weight of an organic ester selected from the group consisting of erythritol tetrabutyrate, erythritol tetraacetate, erythritol tetrapropionate, erythritol monooleate, erythritol tetraoleate, erythritol laurate, pentaerythritol laurate and glycerol laurate, maintaining the resulting admixture under conditions so as to uniformly mix said ester with the said copolymer, and recovering the said rubbery copolymer in a plasticized form as product of the process.

6. A product of vulcanization of a rubbery copolymer of 1,3-butadiene and acrylonitrile which has been vulcanized with sulfur in the presence of an organic ester selected from the group consisting of erythritol tetrabutyrate, erythritol tetraacetate, erythritol tetrapropionate, erythritol monooleate, erythritol tetraoleate, erythritol laurate, pentaerythritol laurate and glycerol laurate.

7. As a new article of manufacture a gasket comprising a vulcanized rubbery copolymer of 1,3-butadiene and acrylonitrile compounded with an organic ester selected from the group consisting of erythritol tetrabutyrate, erythritol tetraacetate, erythritol tetrapropionate, erythritol monooleate, erythritol tetraoleate, erythritol laurate, pentaerythritol laurate and glycerol laurate.

8. As a new article of manufacture a tank, a liner bonded to said tank and a liquid hydrocarbon fuel contained within said liner, said liner being fabricated from a vulcanized rubbery copolymer of 1,3-butadiene and acrylonitrile compounded with an organic ester selected from the group consisting of erythritol tetrabutyrate, erythritol tetraacetate, erythritol tetrapropionate, erythritol monooleate, erythritol tetraoleate, erythritol laurate, pentaerythritol laurate and glycerol laurate.

References Cited in the file of this patent

UNITED STATES PATENTS

| Number | Name | Date |
|---|---|---|
| 1,406,667 | Macbeth | Feb. 14, 1922 |
| 2,141,885 | Straus | Dec. 27, 1938 |
| 2,160,372 | Stark | May 30, 1939 |
| 2,386,443 | Davis | Oct. 9, 1945 |
| 2,392,902 | Crawford | Jan. 15, 1946 |
| 2,414,740 | Holmes | Jan. 21, 1947 |
| 2,425,514 | Dasher et al. | Aug. 12, 1947 |
| 2,446,815 | Davies et al. | Aug. 10, 1948 |
| 2,471,789 | Soday | May 31, 1949 |
| 2,508,262 | Jennings et al. | May 16, 1950 |
| 2,537,036 | Colbeth | Jan. 9, 1951 |
| 2,626,968 | Newell | Jan. 27, 1953 |

FOREIGN PATENTS

| | | |
|---|---|---|
| 906,818 | France | May 28, 1945 |